United States Patent
Foreman et al.

(10) Patent No.: US 10,049,570 B2
(45) Date of Patent: Aug. 14, 2018

(54) CONTROLLING RIGHT-OF-WAY FOR PRIORITY VEHICLES

(71) Applicant: GLOBALFOUNDRIES INC., Grand Cayman (KY)

(72) Inventors: Eric A. Foreman, Fairfax, VT (US); Sudeep Mandal, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 327 days.

(21) Appl. No.: 14/918,776

(22) Filed: Oct. 21, 2015

(65) Prior Publication Data

US 2017/0116849 A1    Apr. 27, 2017

(51) Int. Cl.
| | |
|---|---|
| *G08G 1/0965* | (2006.01) |
| *G01C 21/34* | (2006.01) |
| *G08G 1/087* | (2006.01) |
| *G01C 21/36* | (2006.01) |

(52) U.S. Cl.
CPC ....... *G08G 1/0965* (2013.01); *G01C 21/3407* (2013.01); *G01C 21/3697* (2013.01); *G08G 1/087* (2013.01)

(58) Field of Classification Search
None
See application file for complete search history.

(56) References Cited

U.S. PATENT DOCUMENTS

| | | | |
|---|---|---|---|
| 6,700,504 B1 * | 3/2004 | Aslandogan | G08G 1/087 340/901 |
| 7,327,280 B2 | 2/2008 | Bachelder et al. | |
| 7,629,898 B2 * | 12/2009 | Kirkpatrick | G08G 1/0965 340/691.6 |
| 9,278,689 B1 * | 3/2016 | Delp | B60W 30/00 |
| 9,576,480 B1 * | 2/2017 | Shoshan | G08G 1/0112 |
| 9,613,531 B2 * | 4/2017 | Alam | G08G 1/0965 |
| 9,751,463 B1 * | 9/2017 | Ramcharitar | B60Q 9/00 |

(Continued)

FOREIGN PATENT DOCUMENTS

JP    2015010887 A    1/2015

OTHER PUBLICATIONS

T. Krathikeyan, N. Sudha Bhuvaneswari and S. Sujatha, "Traffic Handling Approach with Intelligent Speed Control and Prioritization of Emergency Vehicles using PCM Agent," International Journal of Computer Technology and Applications, vol. 3, No. 4, pp. 1545-1549, Jul.-Aug. 2012.*

*Primary Examiner* — Peter D Nolan
(74) *Attorney, Agent, or Firm* — David Cain; Hoffman Warnick LLC

(57) ABSTRACT

Various embodiments include approaches for analyzing a set of travel pathways for a priority vehicle. In some cases, an approach includes: obtaining data indicating a location of the priority vehicle and a location of a destination for the priority vehicle; ranking each of a set of paths between the location of the priority vehicle and the location of the destination based upon a travel time for the priority vehicle along the set of paths; and sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

15 Claims, 7 Drawing Sheets

(56) References Cited

U.S. PATENT DOCUMENTS

| | | | |
|---|---|---|---|
| 2005/0264431 A1* | 12/2005 | Bachelder | G08G 1/081 340/906 |
| 2006/0184319 A1* | 8/2006 | Seick | G01C 21/28 701/533 |
| 2007/0159354 A1* | 7/2007 | Rosenberg | G08G 1/0965 340/902 |
| 2008/0106435 A1* | 5/2008 | Kirkpatrick | G08G 1/0965 340/902 |
| 2010/0153002 A1* | 6/2010 | Lee | G01C 21/3407 701/533 |
| 2011/0018736 A1* | 1/2011 | Carr | G08G 1/0965 340/902 |
| 2012/0078506 A1* | 3/2012 | Husain | G01C 21/3492 701/414 |
| 2013/0033386 A1 | 2/2013 | Zlojutro | |
| 2013/0116915 A1* | 5/2013 | Ferreira | G08G 1/163 701/117 |
| 2016/0210858 A1* | 7/2016 | Foster | G08G 1/0965 |
| 2017/0030725 A1* | 2/2017 | Gordon | G01C 21/3415 |
| 2017/0092124 A1* | 3/2017 | Duale | G08G 1/087 |
| 2017/0276495 A1* | 9/2017 | Krishnan | G01C 21/3415 |

* cited by examiner

CONTROLLING RIGHT-OF-WAY FOR PRIORITY VEHICLES

FIELD

The subject matter disclosed herein relates to vehicles. More particularly, the subject matter disclosed herein relates to communication between vehicles to provide right-of-way to priority (e.g., emergency responder) vehicles.

BACKGROUND

As roadways become ever-more crowded with vehicles (e.g., automobiles, motorcycles, bicycles, etc.), it is increasingly difficult for priority vehicles to traverse desired pathways to reach a destination. On many roadways, traffic congestion is so severe that even when a priority vehicle attempts to traverse a central or peripheral path, there is insufficient space available to pass, either between other vehicles or between a vehicle and the edge of the roadway. As such, many priority vehicles are either delayed in reaching their destination, or must take an alternate (often inferior) route.

BRIEF DESCRIPTION

Various embodiments of the disclosure include approaches for analyzing a set of travel pathways for a priority vehicle. In some cases, an approach includes: obtaining data indicating a location of the priority vehicle and a location of a destination for the priority vehicle; ranking each of a set of paths between the location of the priority vehicle and the location of the destination based upon a travel time for the priority vehicle along the set of paths; and sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

A first aspect of the disclosure includes a system having: at least one computing device configured analyze a set of travel pathways for a priority vehicle by performing actions including: obtaining data indicating a location of the priority vehicle and a location of a destination for the priority vehicle; ranking each of a set of paths between the location of the priority vehicle and the location of the destination based upon a travel time for the priority vehicle along the set of paths; and sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

A second aspect of the disclosure includes a computer program product having program code stored on a computer-readable storage medium, which when executed by at least one computing device, causes the at least one computing device to analyze a set of travel pathways for a priority vehicle by performing actions including: obtaining data indicating a location of the priority vehicle and a location of a destination for the priority vehicle; ranking each of a set of paths between the location of the priority vehicle and the location of the destination based upon a travel time for the priority vehicle along the set of paths; and sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

A third aspect of the disclosure includes a computer-implemented method of analyzing a set of travel pathways for a priority vehicle, performed on at least one computing device, the method comprising: obtaining data indicating a location of the priority vehicle and a location of a destination for the priority vehicle; ranking each of a set of paths between the location of the priority vehicle and the location of the destination based upon a travel time for the priority vehicle along the set of paths; and sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

BRIEF DESCRIPTION OF THE FIGURES

These and other features of this invention will be more readily understood from the following detailed description of the various aspects of the invention taken in conjunction with the accompanying drawings that depict various embodiments of the invention, in which.

Figure 1:
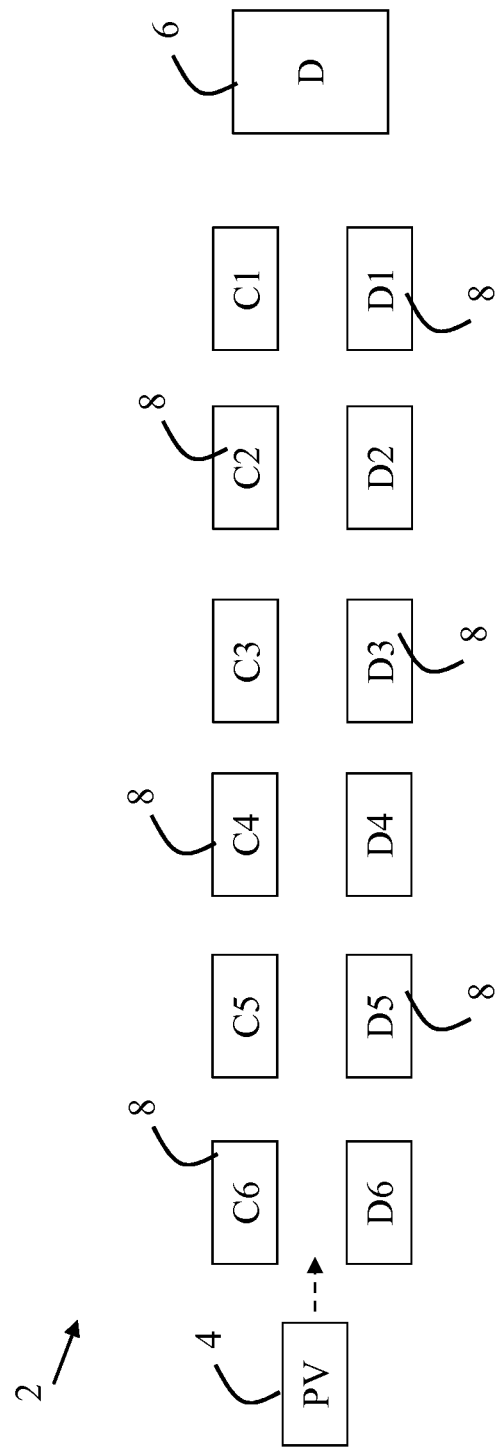
FIG. 1 shows a schematic depiction of a path of travel for a priority vehicle, according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As indicated above, the subject matter disclosed herein relates to vehicles. More particularly, the subject matter disclosed herein relates to controlling vehicle traffic to provide right-of-way to priority vehicles.

In contrast to conventional approaches, various aspects of the disclosure include systems, computer program products and associated methods for giving right-of-way to priority vehicles (e.g., emergency responder vehicles such as ambulances, police vehicles and/or fire trucks, as well as security vehicles such as those transporting persons of interest such as public officials, celebrities, etc.) on roadways. These approaches utilize a beginning-of-line (BoL) transition calculation to initiate movement of vehicles farther (or, farthest) from the priority vehicle prior to movement of vehicles closer (up to the closest) from the priority vehicle. The approaches according to various embodiments utilize cloud-based technology to communicate with vehicles along a desired emergency vehicle route, and can gather data about particular characteristics of those vehicles to enhance efficient movement of those vehicles from the route. In various embodiments, approaches described according to embodiments detect (or otherwise acquire, e.g., from vehicles, registration records, etc.) a vehicle type (e.g., including turning radius, length, and/or width) for each vehicle between the priority vehicle and the destination along a plurality of possible routes, and calculate an expected travel time along each route based upon the types of vehicles and the space/time constraints involved in those vehicles moving to a location which permits the priority vehicle to pass. In some cases, each vehicle is assigned a delay value and a random variable so that the aggregate vehicle movement along each path can be quantified. The delay value can account for vehicle particulars such as turning radius, length, width, type, etc. (e.g., where a large truck will add delay time, while a smaller compact sedan will subtract delay time), as well as spacing between vehicles (both laterally and along the path), the presence (and size) of a shoulder on the route, and/or the number of lanes along each route.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

FIG. 1 shows a schematic depiction of a pathway 2 over which one or more priority vehicle(s) 4 (e.g., emergency responder vehicles such as ambulances, police vehicles and/or fire trucks, as well as security vehicles such as those transporting persons of interest such as public officials, celebrities, etc.) can travel to reach a destination 6 (e.g., a hospital, police station, area of danger/interest (e.g., airport, home, etc.), or area of safety (e.g., shelter during natural disaster, or waterway during wildfire), etc.). Between destination and priority vehicle 4 are vehicles 8 (e.g., obstructing vehicles), which may hinder (e.g., block or slow) the travel path between priority vehicle 4 and destination 6. Pathway 2 is one of a plurality of pathways (2) between priority vehicle 4 and destination 6, as illustrated in the schematic depiction of an environment 10 in FIG. 2. Each pathway 2 can have its own unique attributes, for example, one pathway 2 may have two lanes of traffic (traveling in direction between priority vehicle 4 and destination 6), while another pathway 2 may have three or four lanes of traffic, and yet another pathway 2 may have one or more rotaries (round-abouts), stop lights, and/or construction zones. One pathway 2 may have a shoulder as wide as a vehicle 8, while another pathway may have a narrower shoulder or no shoulder at all. Various differences between pathways 2 will be understood by those having skill in the art.

Figure 2:
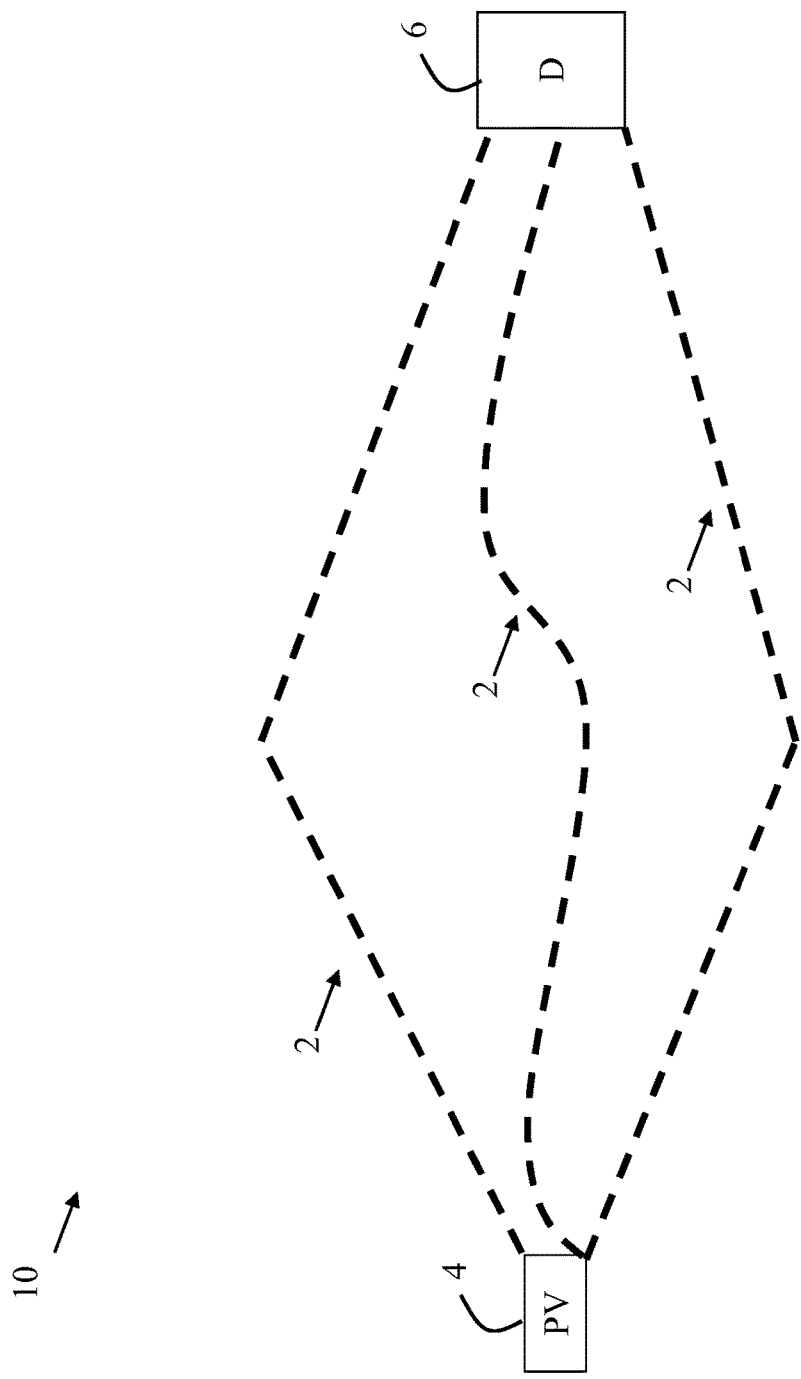
FIG. 2 shows a schematic depiction of an environment including a plurality of vehicle paths.
Figure 3:
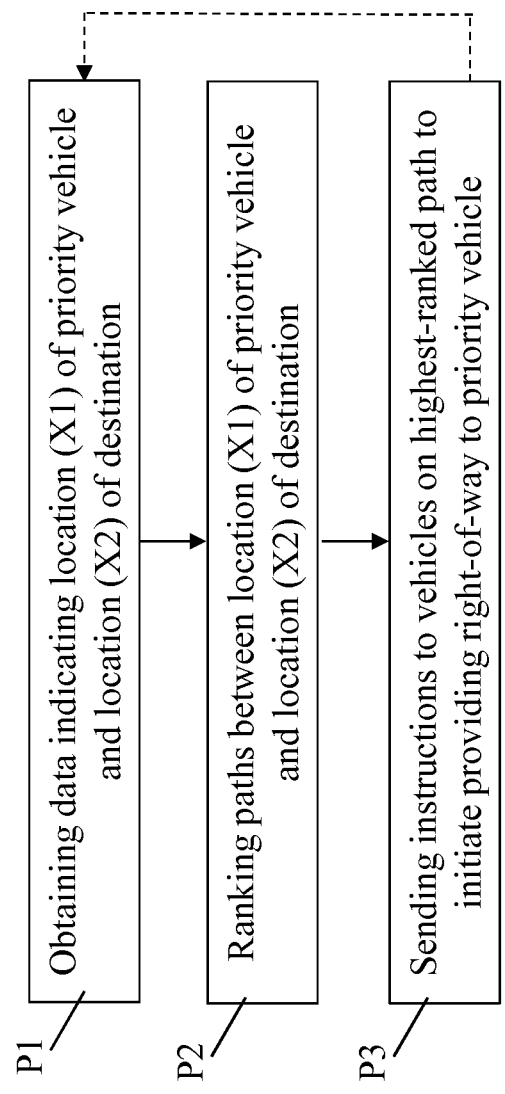
FIG. 3 shows a flow diagram illustrating a method performed according to particular embodiments of the disclosure.

With continuing reference to FIGS. 1 and 2, according to various embodiments, a method can include analyzing a set of travel pathways 2 (e.g., two or more pathways 2) for priority vehicle 4 in order to determine a fastest travel time between priority vehicle 4 and destination 6. A priority vehicle travel system 28 (FIG. 7) can perform various processes as described herein to analyze the set of travel pathways 2. It is understood that priority vehicle travel system 28 can be a cloud-based or other internet-enabled analysis/control system configured to communicate with priority vehicle 4 and other vehicles 8. In various embodiments, priority vehicle 4 and other vehicles 8 can be connected to a cloud-based or other internet-based information transmission service, located at priority vehicle travel system 28 or in communication with priority vehicle travel system 28, such that the locations X1 and X2 are readily obtainable, e.g., via wireless transmission, internet-connection and/or global positioning system (GPS) data. Further, priority vehicles 4 can be registered with priority vehicle travel system 28 and can include preferences or other profile settings such as preferences for types of destinations 6 (e.g., hospitals, versus urgent care facilities), as well as information about the make, model and size of priority vehicle 4. Locations of destinations 6 can be obtained from GPS data or other map data readily available to those having skill in the art. Other vehicles 8 can either be pre-registered with priority vehicle travel system 28, or may be internet enabled vehicles capable of providing information about make, model, size, etc. of vehicle 8 via cloud-based communication (as described herein). Turning to FIG. 3, with continuing reference to FIGS. 1-2, a flow diagram illustrating processes according to various embodiments, the processes including:

Process P1: obtaining data indicating a location (X1) of priority vehicle 4 and a location (X2) of destination 6 for priority vehicle 4. As noted herein, the locations X1, X2 can be obtained via a communication system (e.g., a cloud-based and/or internet-based communication system, in communication with priority vehicle travel system 28). In various embodiments, this process can include a pre-process that includes obtaining a request from priority vehicle 4 for assistance in navigating to destination 6. In some cases, this request may be transmitted from priority vehicle 4 and/or a related dispatch system connected (e.g., via conventional wireless and/or hard-wired means) with priority vehicle 4. In various embodiments, priority vehicle 4 can be linked with the priority vehicle travel system 28 (FIG. 7) shown and described herein in order to provide real-time communications between priority vehicle 4 and priority vehicle travel system 28.

Figure 4:
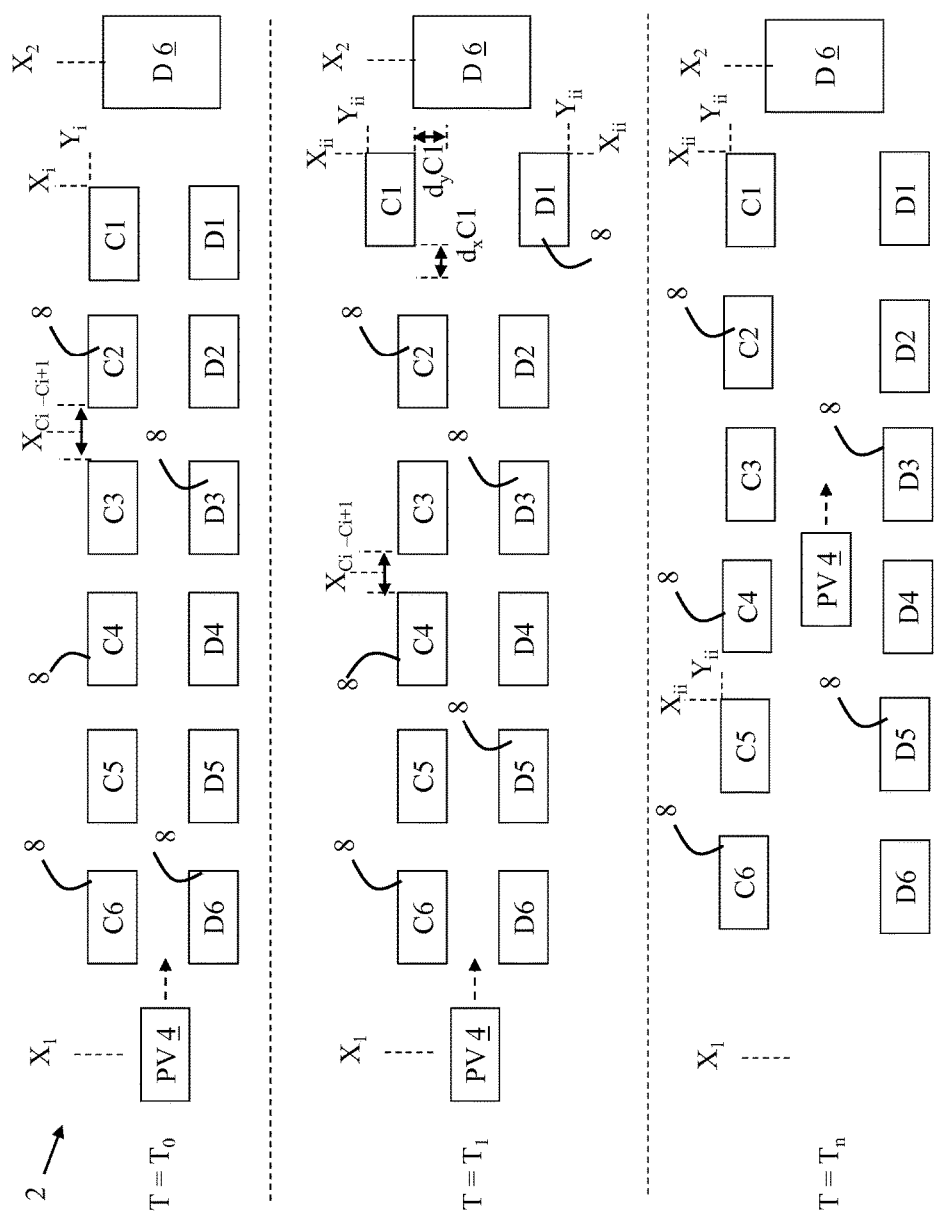
FIG. 4 shows a schematic depiction of vehicle travel along a path over time, according to various embodiments of the disclosure.

Process P2: ranking each of a set of paths 2 between the location X1 of priority vehicle 4 and the location X2 of destination 6 based upon a travel time for the priority vehicle 4 along the set of paths 2. In various embodiments, a higher ranking correlates with a shorter travel time along a path 2 (e.g., higher ranked paths 2 are shorter trips). In various embodiments, ranking travel times includes determining a number of vehicles 8 between priority vehicle 4 (at location X1) and the location X2 of destination 6 and a predicted right-of-way time for each of vehicles 8 along the path 2. In various embodiments, the shorter travel time for a path 2 (ranking) is assigned to the path 2 having the lowest sum of the number of vehicles 8 and the predicted right-of-way time for each of the vehicles 8 along path 2. A right-of-way time as used herein is a time required for each vehicle 8 to move from an obstructed position $X_i$, $Y_i$ to an unobstructed position $X_{ii}$, $Y_{ii}$. FIG. 4 shows a schematic depiction of movement of plurality of vehicles 8 from a starting position (obstructed position $X_i$, $Y_i$) to an unobstructed position ($X_{ii}$, $Y_{ii}$) along path 2 over a period (between time $T_0$ and time $T_n$. As is evident in FIG. 4, when all vehicles 8 move to respective unobstructed positions (Xii, Yii), priority vehicle 4 is able to pass (see time (T)=$T_n$). Each vehicle 8 can have a corresponding right-of-way time, which can be based upon the length of the vehicle 8 (in X direction), the width of vehicle 8 (in Y direction), as well as the turning radius of vehicle 8, and/or a distance between each vehicle 8 and its adjacent vehicle 8 ($X_{Ci-Ci+1}$). According to various embodiments, a composite delay ($D_{total}$) time for each path 2 is a composite of the individual right-of-way times for each vehicle 8 on that path 2. As shown in FIG. On 4 (e.g., at times T=T1 and T=Tn), for a plurality of vehicles 8 (labeled in rows C1-C6 and D1-D6, respectively), each vehicle 8 moves a distance in the X direction (dxC1, dxC2, etc.), and a distance in the Y direction (dyC1, dyC2, etc.) in order to reach unobstructed position ($X_{ii}$, $Y_{ii}$). In some cases, the composite delay ($D_{total}$) for a path 2 is based upon the following equation:

$$D_{Total} = \sum_{i=1}^{N} D_i + \sqrt{\sum_{i=1}^{N} (R_i)^2} \qquad \text{(Equation 1)}$$

Where $D_i$=time (e.g., seconds) to move vehicle C1 and D1 (summed to include moving vehicles C2-C6, and D2-D6) from obstructed position Xi, Yi to unobstructed position Xii, Yii; $R_i$=time (e.g., seconds) of difference between moving vehicle C1 and D1 (summed to include moving vehicles C2-C6, and D2-D6), which is treated as a random variable. This random variable can include a random number, generated, for example by a random number generator or other known mechanism for generating random numbers. The random variable can account for the positive and negative times required for each vehicle (e.g., C1-C6) relative to their predicted time ($D_i$). Each delay $D_i$ and $R_i$ can be modeled uniquely for each type of vehicle 8, and can be based, for example, upon a length of each vehicle 8, a turning radius of each vehicle 8, a width of each vehicle 8, as well as a width of path 2, the presence of a shoulder (and its width) on path 2, etc.

Process P3: After ranking paths 2, the process can include sending instructions to vehicles 8 on a highest-ranked path 2 in the set of paths 2 to initiate providing a right-of-way to priority vehicle 4. According to various embodiments, this can include instructing vehicles 8 closer to destination 6 (e.g., C1, D1) to change their corresponding position (e.g., $X_i$, $Y_i$ to $X_{ii}$, $Y_{ii}$) prior to vehicles farther from the destination 6 (e.g., C2, C3, etc. and D2, D3, etc.) along the highest-ranked path 2. This approach can be considered a beginning of line (BoL) transition approach, which initiates movement of vehicles 8 from farthest-to-closest to the priority vehicle 4, in contrast to conventional emergency scenarios where vehicles move on a closest-to-farthest basis. That is, according to various embodiments, the process includes sequentially instructing vehicles 8 (e.g., from C1, to C2, to C3) along highest-ranked path 2 to provide right-of way (move from position $X_i$, $Y_i$ to $X_{ii}$, $Y_{ii}$) to priority vehicle 4, starting at the vehicle 8 farthest from priority vehicle 4 (e.g., C1) and progressing to a vehicle closest to priority vehicle 4 (e.g., C6), along the highest-ranked path 2.

As demonstrated in the schematic depiction in FIG. 4 at Time=$T_n$, all vehicles 8 have provided right-of-way to priority vehicle 4, which now has an unobstructed route to destination 6. It is understood that not all X and Y coordinates for each vehicle 8 (e.g., C5, D2, etc.) are labeled in the figures for simplicity of illustration, but that each vehicle 8 (e.g., C5, D2) is located at its corresponding unobstructed position ($X_{ii}$, $Y_{ii}$) at time T=$T_n$).

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling on-demand network access to a shared pool of configurable computing resources (e.g. networks, network bandwidth, servers, processing, memory, storage, applications, virtual machines, and services) that can be provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer may not have control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale.

Measured service: cloud systems automatically control resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. A cloud computing infrastructure includes a network of interconnected nodes.

Figure 5:
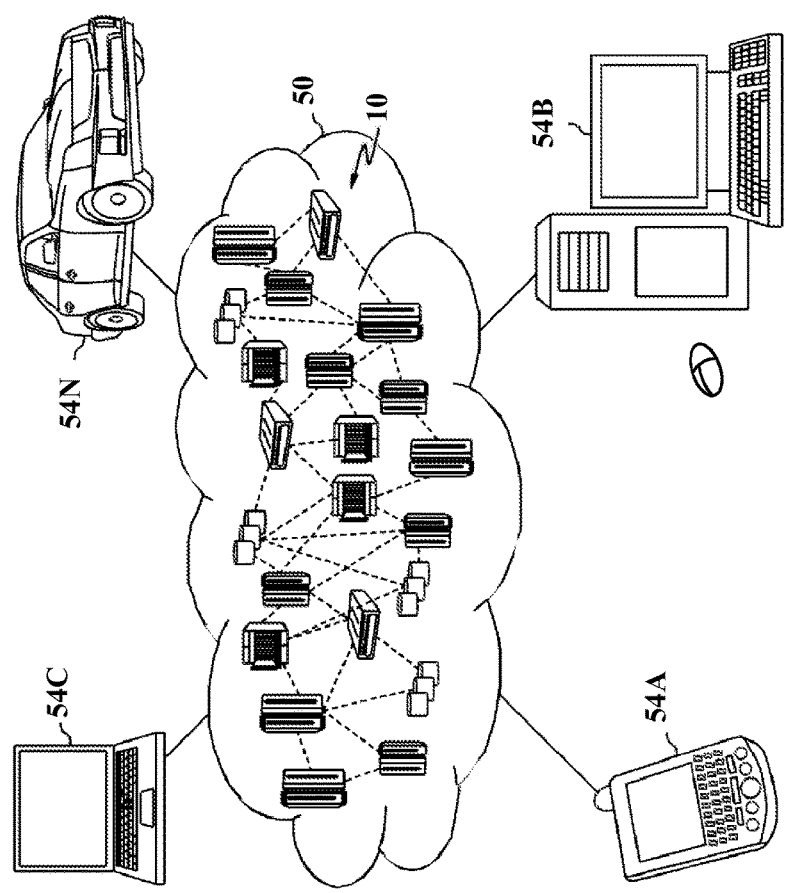
FIG. 5 depicts a cloud computing environment according to an embodiment of the present disclosure.

Referring now to FIG. 5, illustrative cloud computing environment 50 is depicted. As shown, cloud computing environment 50 can include one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
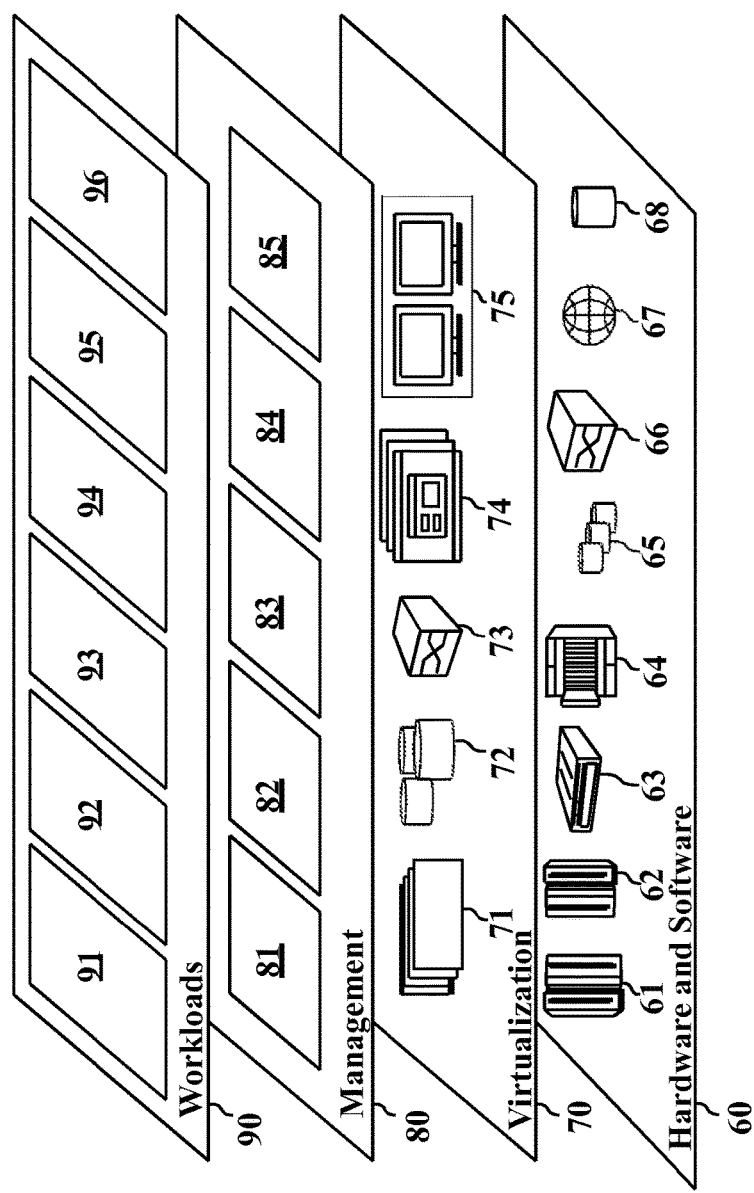
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and priority vehicle travel management 96.

Figure 7:
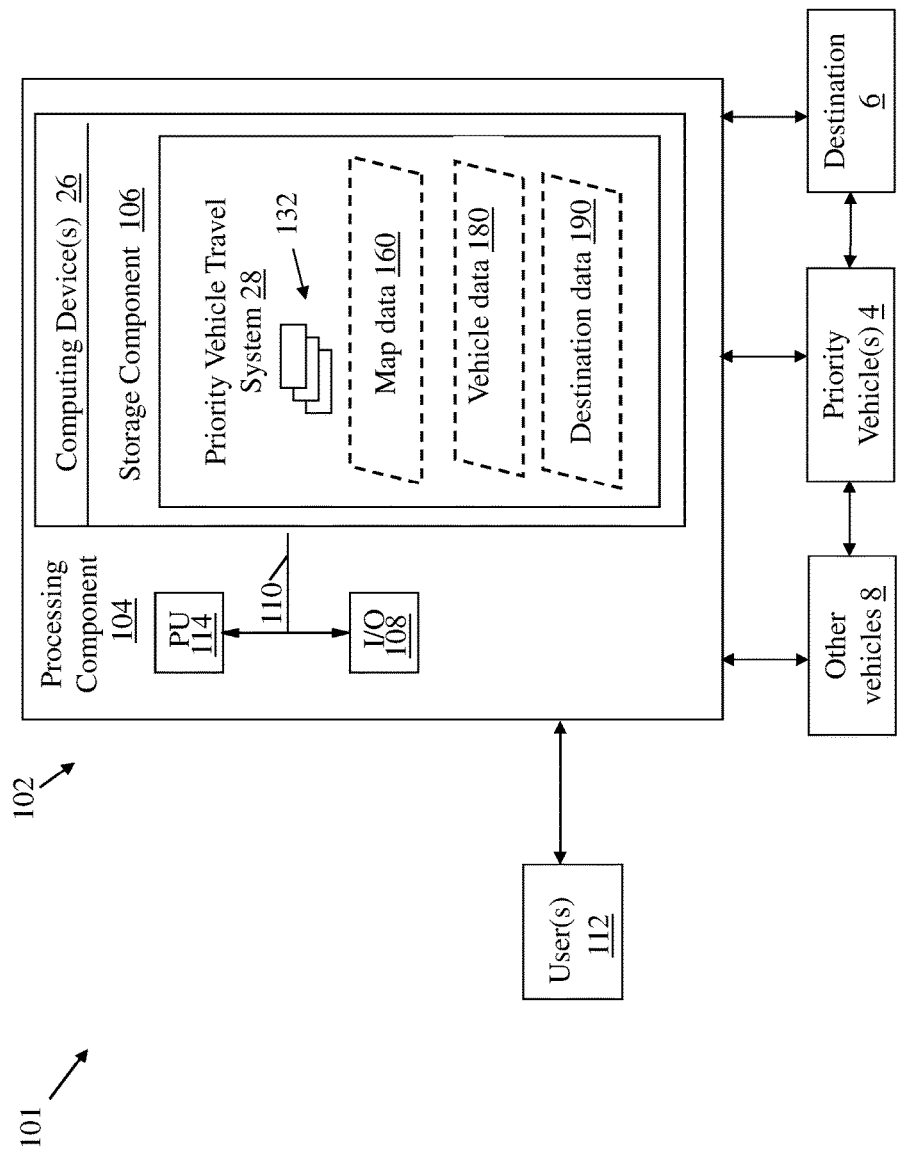
FIG. 7 shows an environment including a system for monitoring and controlling travel of a priority vehicle, according to various embodiments of the disclosure.

FIG. 7 shows an illustrative environment 101 including priority vehicle travel system 28, for performing the functions described herein according to various embodiments of the invention. To this extent, the environment 101 includes a computer system 102 that can perform one or more processes described herein in order to monitor and/or control a plurality of vehicles 8 along a path 2 (FIG. 1). In particular, the computer system 102 is shown as including the priority vehicle travel system 28, which makes computer system 102 operable to control/monitor operation of a plurality of vehicles 8 along a path 2 by performing any/all of the processes described herein and implementing any/all of the embodiments described herein.

The computer system 102 is shown including a computing device 26, which can include a processing component 104 (e.g., one or more processors, such as processor (PU 114)), a storage component 106 (e.g., a storage hierarchy), an input/output (I/O) component 108 (e.g., one or more I/O interfaces and/or devices), and a communications pathway 110. In general, the processing component 104 executes program code, such as the priority vehicle travel system 28, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human and/or computerized user) 112 to interact with the computer system 102 and/or one or more communications devices to enable the system user 112 to communicate with the computer system 102 using any type of communications link. To this extent, the priority vehicle travel system 28 can manage a set of interfaces (e.g., graphical user interface(s), application program interface, etc.) that enable human and/or system users 112 to interact with the priority vehicle travel system 28. Further, the priority vehicle travel system 28 can manage (e.g., store, retrieve, create, manipulate, organize, present, etc.) data, such as map data 160 (e.g., data about the physical layouts of a plurality of paths 2, including, for example, speed limits along paths 2, numbers of lanes along paths 2, presence and/or size of shoulder or emergency lane along paths 2, number of lanes along portions of paths 2, grade and road composition/status along paths 2, etc.), vehicle data 180 (e.g., data about priority vehicle(s) 4 such as width, height, maximum speed, etc., data about other vehicles 8 including, e.g., turning radius, length, width, make/model, and spacing between vehicles 8) and/or destination data 190 (e.g., including information about capabilities of destination, e.g., if a medical facility, whether the medical facility has an emergency room equipped to treat a particular type of patient emergency; if an airport or travel hub, whether the travel hub has the capability to transport the desired number of type of passengers or cargo, etc.) using any solution, e.g., via wireless and/or hardwired means.

In any event, the computer system 102 can comprise one or more general purpose computing articles of manufacture (e.g., computing devices) capable of executing program code, such as the priority vehicle travel system 28, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the priority vehicle travel system 28 can be embodied as any combination of system software and/or application software. It is further understood that the priority vehicle travel system 28 can be implemented in a cloud-based computing environment, where one or more processes are performed at distinct computing devices (e.g., a plurality of computing devices 26), where one or more of those distinct computing devices may contain only some of the components shown and described with respect to the computing device 26 of FIG. 7.

Further, the priority vehicle travel system 28 can be implemented using a set of modules 132. In this case, a module 132 can enable the computer system 102 to perform a set of tasks used by the Priority vehicle travel system 28, and can be separately developed and/or implemented apart from other portions of the priority vehicle travel system 28. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of priority vehicle travel system 28 fixed thereon (e.g., one or more modules 132). However, it is understood that the computer system 102 and priority vehicle travel system 28 are only representative of various possible equivalent computer systems that may perform a process described herein. To this extent, in other embodiments, the functionality provided by the computer system 102 and priority vehicle travel system 28 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices 26, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

While shown and described herein as a method and system for controlling a plurality of vehicles 8 along a path 2 (FIG. 1), it is understood that aspects of the invention further provide various alternative embodiments. For example, in one embodiment, the invention provides a computer program fixed in at least one computer-readable medium, which when executed, enables a computer system to control a plurality of vehicles 8 along a path 2. To this extent, the computer-readable medium includes program code, such as the priority vehicle travel system 28 (FIG. 7), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the priority vehicle travel system 28 (FIG. 7), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of controlling a plurality of vehicles 8 along a path 2 (FIG. 1). In this case, a computer system, such as the computer system 102 (FIG. 7), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the invention, including, e.g., the priority vehicle travel system 28, is to control a plurality of vehicles 8 along a path 2. It is understood that according to various embodiments, the priority vehicle travel system 28 could be implemented to control operation of a plurality of vehicles 8 (including priority vehicles 4), as described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system comprising:
   at least one computing device configured analyze a set of travel pathways for a priority vehicle by performing actions including:
      obtaining data indicating a location of the priority vehicle and a location of a destination for the priority vehicle;
      ranking each of a set of paths between the location of the priority vehicle and the location of the destination based upon a travel time for the priority vehicle along the set of paths,
      wherein a higher ranking correlates with a shorter travel time along the set of paths,
      wherein the ranking based upon the travel time includes determining a number of vehicles between the priority vehicle and the location of the destination and a predicted right-of-way time for each of the vehicles along the path, wherein the shorter travel time is assigned to the path having the lowest sum of the number of vehicles along the path and the predicted right-of-way time for each of the vehicles along the path; and
      sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

2. The system of claim 1, wherein each vehicle along each of the set of paths is assigned a delay time based upon movement from a current position thereof to a right-of-way position and a random time variable.

3. The system of claim 2, wherein the delay time is based upon a number of rows of vehicles along the path.

4. The system of claim 2, wherein the delay time for each vehicle is based upon at least one of a length of each vehicle or a turning radius of each vehicle.

5. The system of claim 1, wherein the at least one computing device is further configured to sequentially instruct vehicles along the highest-ranked path to provide right-of-way to the priority vehicle, starting at a vehicle farthest from the priority vehicle and progressing to a vehicle closest to the priority vehicle, along the highest-ranked path.

6. A computer program product comprising program code stored on a non-transitory computer-readable medium, which when executed by at least one computing device, causes the at least one computing device to analyze a set of travel pathways for a priority vehicle by performing actions including:
- obtaining data indicating a location of the priority vehicle and a location of a destination for the priority vehicle;
- ranking each of a set of paths between the location of the priority vehicle and the location of the destination based upon a travel time for the priority vehicle along the set of paths,
- wherein a higher ranking correlates with a shorter travel time along the set of paths,
- wherein the ranking based upon the travel time includes determining a number of vehicles between the priority vehicle and the location of the destination and a predicted right-of-way time for each of the vehicles along the path, wherein the shorter travel time is assigned to the path having the lowest sum of the number of vehicles along the path and the predicted right-of-way time for each of the vehicles along the path; and
- sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

7. The computer program product of claim 6, wherein each vehicle along each of the set of paths is assigned a delay time based upon movement from a current position thereof to a right-of-way position and a random time variable.

8. The computer program product of claim 7, wherein the delay time is based upon a number of rows of vehicles along the path.

9. The computer program product of claim 7, wherein the delay time for each vehicle is based upon at least one of a length of each vehicle or a turning radius of each vehicle.

10. The computer program product of claim 6, wherein the program code causes the at least one computing device to sequentially instruct vehicles along the highest-ranked path to provide right-of-way to the priority vehicle, starting at a vehicle farthest from the priority vehicle and progressing to a vehicle closest to the priority vehicle, along the highest-ranked path.

11. A computer-implemented method of analyzing a set of travel pathways for a priority vehicle, performed on at least one computing device, the method comprising:
- obtaining data indicating a location of the priority vehicle and a location of a destination for the priority vehicle;
- ranking each of a set of paths between the location of the priority vehicle and the location of the destination based upon a travel time for the priority vehicle along the set of paths,
- wherein each vehicle along each of the set of paths is assigned a delay time based upon movement from a current position thereof to a right-of-way position and a random time variable; and
- sending instructions to vehicles on a highest-ranked path in the set of paths to initiate providing a right-of-way to the priority vehicle, wherein vehicles closer to the destination along the highest-ranked path are instructed to change a corresponding position prior to vehicles farther from the destination along the highest-ranked path.

12. The computer-implemented method of claim 11, wherein a higher ranking correlates with a shorter travel time along the set of paths, wherein the ranking based upon the travel time includes determining a number of vehicles between the priority vehicle and the location of the destination and a predicted right-of-way time for each of the vehicles along the path, wherein the shorter travel time is assigned to the path having the lowest sum of the number of vehicles along the path and the predicted right-of-way time for each of the vehicles along the path.

13. The computer-implemented method of claim 11, wherein the delay time is based upon a number of rows of vehicles along the path.

14. The computer-implemented method of claim 11, wherein the delay time for each vehicle is based upon at least one of a length of each vehicle or a turning radius of each vehicle.

15. The computer-implemented method of claim 11, wherein the program code causes the at least one computing device to sequentially instruct vehicles along the highest-ranked path to provide right-of-way to the priority vehicle, starting at a vehicle farthest from the priority vehicle and progressing to a vehicle closest to the priority vehicle, along the highest-ranked path.

* * * * *